United States Patent
Toba et al.

(10) Patent No.: US 10,027,171 B2
(45) Date of Patent: Jul. 17, 2018

(54) POWER TRANSMITTING COMMUNICATION UNIT

(71) Applicant: Yazaki Corporation, Tokyo (JP)

(72) Inventors: Tatsuo Toba, Kanagawa (JP); Yuta Nakagawa, Kanagawa (JP); Yoichi Ido, Kanagawa (JP); Shingo Tanaka, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 78 days.

(21) Appl. No.: 15/240,398

(22) Filed: Aug. 18, 2016

(65) Prior Publication Data

US 2017/0054327 A1 Feb. 23, 2017

(30) Foreign Application Priority Data

Aug. 21, 2015 (JP) ................................. 2015-163742

(51) Int. Cl.
*H02J 50/10* (2016.01)
*H02J 50/80* (2016.01)
*H04B 5/00* (2006.01)
*H02J 50/70* (2016.01)
*H01F 38/14* (2006.01)

(52) U.S. Cl.
CPC .............. *H02J 50/10* (2016.02); *H02J 50/70* (2016.02); *H02J 50/80* (2016.02); *H04B 5/0012* (2013.01); *H01F 38/14* (2013.01)

(58) Field of Classification Search
CPC . H02J 5/005; H02J 7/025; H02J 17/00; H04B 5/0025–5/0093; B60L 11/182; H01F 38/14
See application file for complete search history.

(56) References Cited

U.S. PATENT DOCUMENTS

| | | | |
|---|---|---|---|
| 2002/0047705 A1 | 4/2002 | Tada et al. | |
| 2008/0076351 A1* | 3/2008 | Washiro | H04B 5/0031 455/41.1 |
| 2009/0121949 A1* | 5/2009 | Washiro | H01Q 7/00 343/702 |

(Continued)

FOREIGN PATENT DOCUMENTS

| | | |
|---|---|---|
| JP | 09-251920 A | 9/1997 |
| JP | 2003-021501 A | 1/2003 |

(Continued)

OTHER PUBLICATIONS

Japanese Office Action for the related Japanese Patent Application No. 2015-163742 dated Oct. 3, 2017.

*Primary Examiner* — Rexford Barnie
*Assistant Examiner* — David Shiao
(74) *Attorney, Agent, or Firm* — Kenealy Vaidya LLP (57) ABSTRACT

A coupling electrode of a communication coupler intersects with an orthogonal plane that is orthogonal to a coil axial line direction of a power transmission coil. That is, the coupling electrode of the communication coupler is not in parallel with the orthogonal plane orthogonal to the coil axial line direction of the power transmission coil. For example, the coupling electrode of the communication coupler is perpendicular to the orthogonal plane being orthogonal to the coil axial line direction, and includes the coil axial line direction in a plane of the coupling electrode.

3 Claims, 9 Drawing Sheets

(56) References Cited

U.S. PATENT DOCUMENTS

| | | | | |
|---|---|---|---|---|
| 2010/0270867 | A1* | 10/2010 | Abe | H02J 7/025 307/104 |
| 2012/0146580 | A1* | 6/2012 | Kitamura | H01F 38/14 320/108 |
| 2012/0325915 | A1* | 12/2012 | Kato | H01Q 1/2225 235/492 |
| 2012/0326520 | A1* | 12/2012 | Konya | H04B 5/0031 307/104 |
| 2016/0043565 | A1* | 2/2016 | Asaoka | H02J 5/005 307/104 |

FOREIGN PATENT DOCUMENTS

| | | | | |
|---|---|---|---|---|
| JP | 2009-124192 A | 6/2009 | | |
| JP | 2009-171070 A | 7/2009 | | |
| JP | 2012-253398 A | 12/2012 | | |
| JP | 2014-49479 A | 3/2014 | | |
| JP | WO 2014156145 A1 * | 10/2014 | | H02J 5/005 |

* cited by examiner

POWER TRANSMITTING COMMUNICATION UNIT

CROSS-REFERENCE TO RELATED APPLICATION(S)

The present application claims priority to and incorporates by reference the entire contents of Japanese Patent Application No. 2015-163742 filed in Japan on Aug. 21, 2015.

BACKGROUND OF THE INVENTION

1. Field of the Invention

The present invention relates to a power transmitting communication unit.

2. Description of the Related Art

Conventionally, there has been a power transmitting communication unit provided with a function to perform the transmission of electric power in a non-contact manner, and a function to perform communication in a wireless manner. The power transmitting communication unit is provided with, on the same substrate, a communication module, and a power transmission coil that is spirally formed around the communication module (for example, Japanese Patent Application Laid-open No. 2014-049479).

The communication module, however, is susceptible to a magnetic field of the power transmission coil, and there has been a problem in that the temperature of the communication module rises by eddy currents.

SUMMARY OF THE INVENTION

The present invention has been made in view of the above-mentioned circumstances, and an object of the present invention is to provide a power transmitting communication unit that can suppress the temperature rise in the communication module.

In order to achieve the above mentioned object, a power transmitting communication unit according to one aspect of the present invention includes a substrate that includes an opening; a power transmission coil that is spirally formed around the opening, mounted on one surface of the substrate, connected to a circuit of the substrate, and performs transmission of electric power in a non-contact manner; and a communication module that is installed at the opening, includes a conductive member formed in a planar shape, and performs wireless communication through the conductive member, wherein the conductive member of the communication module intersects with an orthogonal plane that is orthogonal to a coil axial line direction of the power transmission coil.

According to another aspect of the present invention, in the power transmitting communication unit, it is preferable that the conductive member of the communication module includes the coil axial line direction in a plane of the conductive member.

According to still another aspect of the present invention, in the power transmitting communication unit, it is preferable that the communication module includes a printed circuit board, and the conductive member is connected to a circuit of the printed circuit board, formed in a predetermined area on at least one surface of the printed circuit board, and includes a coupling electrode that accumulates electrical charges.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

With reference to the accompanying drawings, a form to implement the present invention (an embodiment) will be described in detail. The invention, however, is not limited by the content described in the following embodiment. Furthermore, the constituent elements described in the following include those that a person skilled in the art can easily assume or that are substantially the same. The configurations described in the following can be combined as appropriate. Moreover, various omissions, substitutions, or modifications of the configurations can be made without departing from the scope of the invention.

Embodiment

Figure 1:
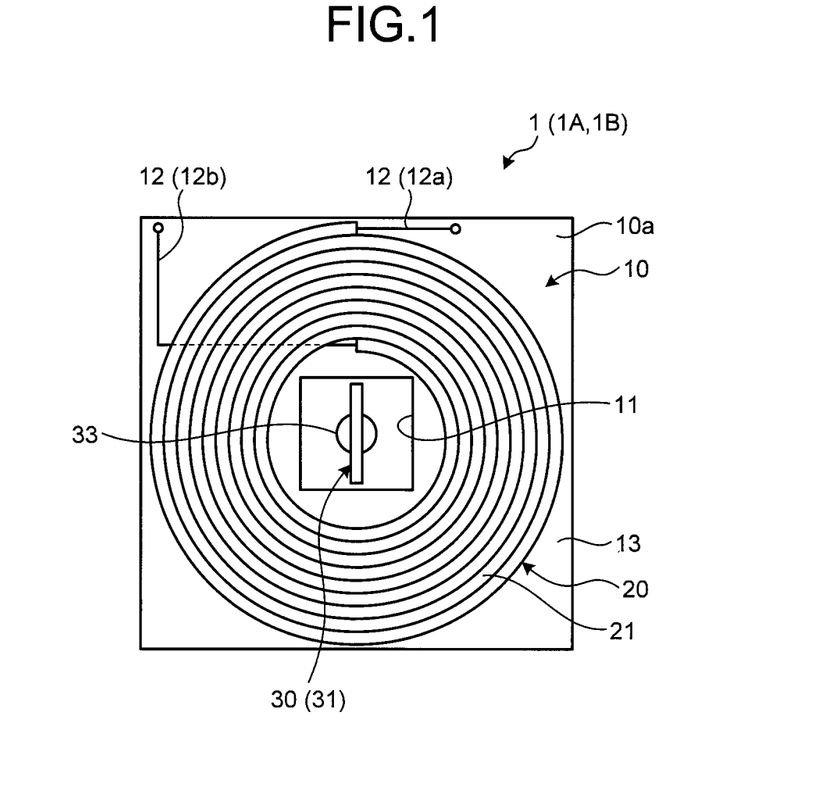
FIG. 1 is a bottom plan view illustrating an example of the configuration of a power transmitting communication unit according to an embodiment.
Figure 2:
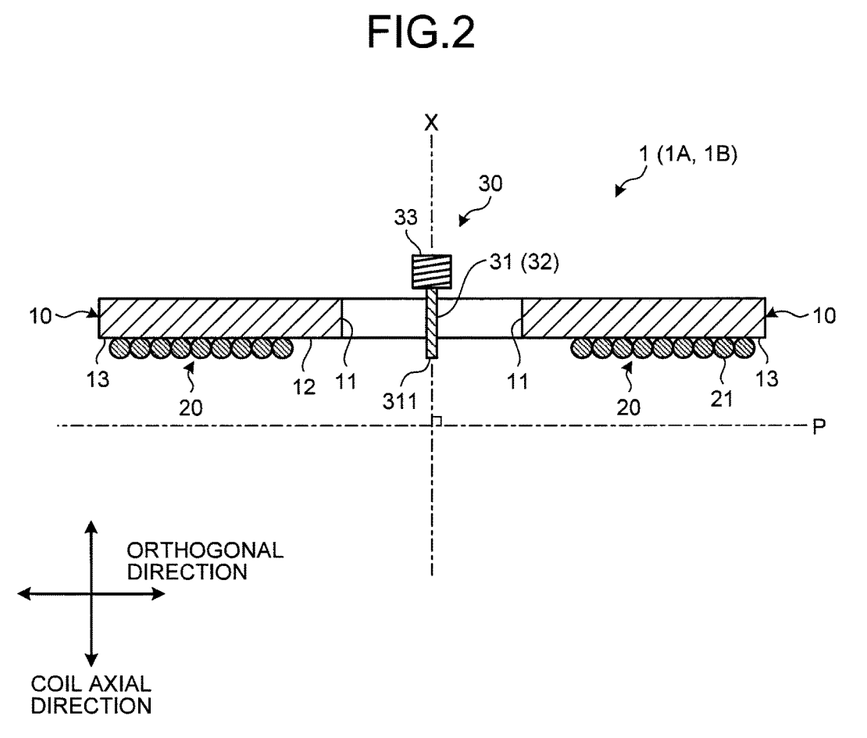
FIG. 2 is a sectional view illustrating an example of the configuration of the power transmitting communication unit in the embodiment.
Figure 3:
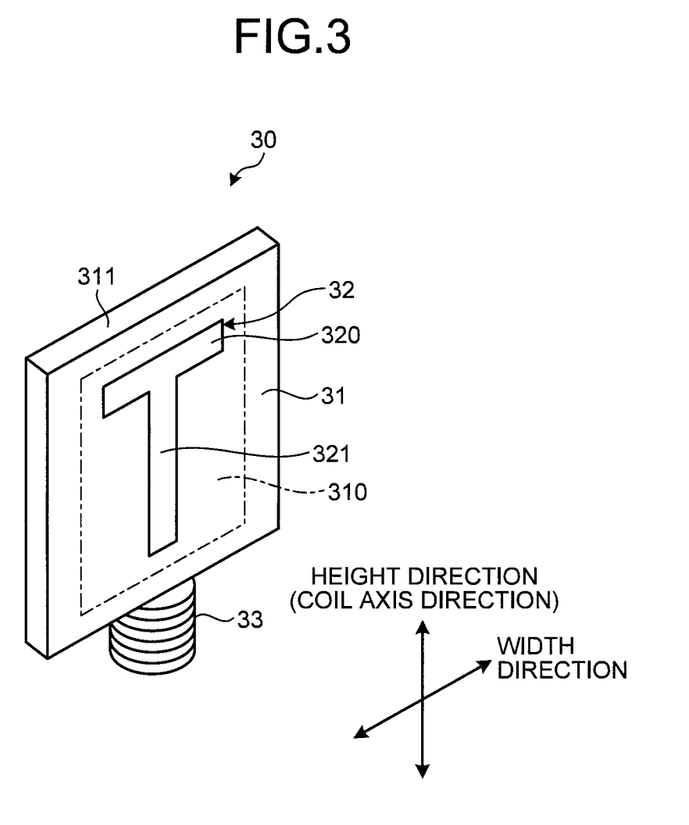
FIG. 3 is a perspective view illustrating an example of the configuration of a communication coupler in the embodiment.
Figure 4:
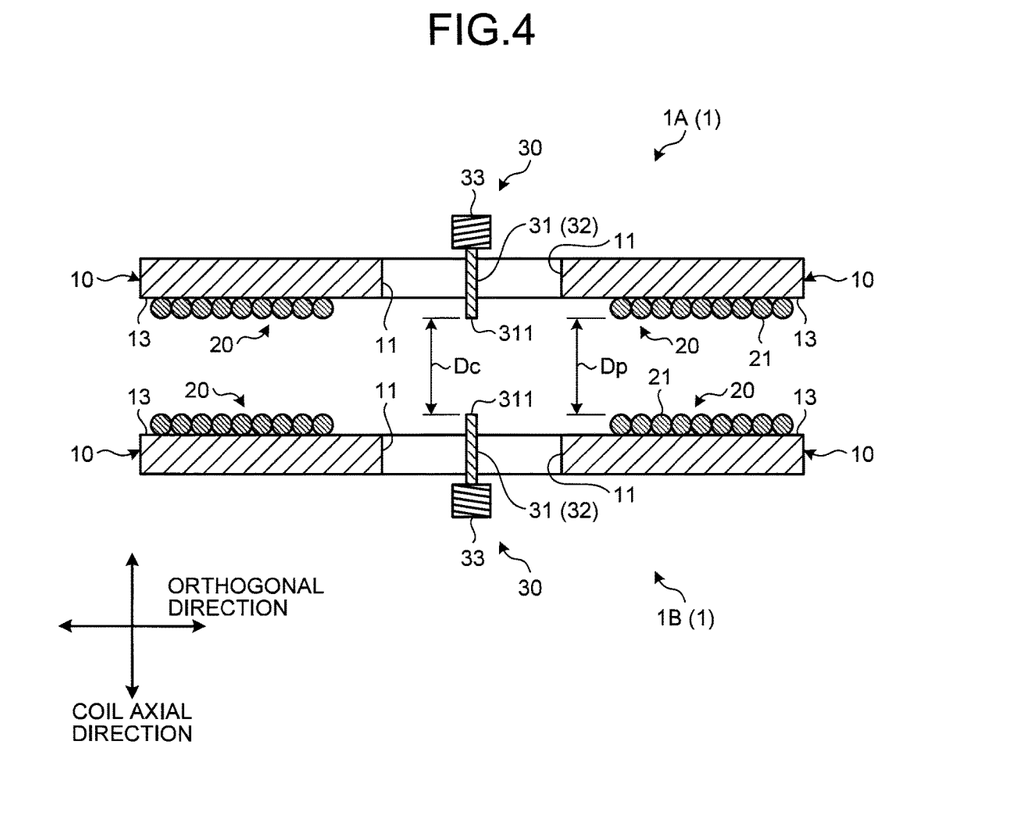
FIG. 4 is a sectional view illustrating a positional relation between the power transmitting communication unit on a power transmitting side and the power transmitting communication unit on a power receiving side in the embodiment.

A power transmitting communication unit according to an embodiment will be described. FIG. 1 is a bottom plan view illustrating an example of the configuration of the power transmitting communication unit in the embodiment. FIG. 2 is a sectional view illustrating an example of the configuration of the power transmitting communication unit in the embodiment. FIG. 3 is a perspective view illustrating an example of the configuration of a communication coupler in the embodiment. FIG. 4 is a sectional view illustrating a positional relation between the power transmitting communication unit on a power transmitting side and the power transmitting communication unit on a power receiving side in the embodiment.

A power transmitting communication unit 1 transmits electric power in a non-contact manner and performs communication in a wireless manner. The power transmitting communication unit 1 includes, as illustrated in FIGS. 1 and 2, a substrate 10 that is a substrate, a power transmission coil 20, and a communication coupler 30 that is a communication module. To facilitate the understanding of description, the power transmitting communication unit 1 is illustrated in a state of a housing being removed.

The substrate 10 includes an insulating material 10a, an opening 11, and a power transmission circuit 12. The insulating material 10a is formed in a plate-like shape of rectangular parallelepiped and includes ferrite that is a magnetic body of high magnetic permeability. In the insulating material 10a, the opening 11 of a rectangular shape is formed in the middle. The opening 11 is opened in a size of not interfering with the communication of the communication coupler 30. On a surface 13 of the power transmission coil 20 side of the insulating material 10a, the power transmission circuit 12 is formed.

The power transmission coil 20 performs transmission of electric power in a non-contact manner. The power transmission coil 20 is spirally formed around the opening 11 of the substrate 10 with a central axis line X as a center, and is mounted on the surface 13 of the power transmission circuit 12 side of the substrate 10. The power transmission coil 20 is connected to the circuit 12 formed on the substrate 10. For example, one end portion of the power transmission coil 20 is connected to a circuit 12a and the other end portion of the power transmission coil 20 is connected to a circuit 12b.

The communication coupler 30 is installed at the opening 11 of the substrate 10 and performs wireless communication with another communication coupler 30. The communication coupler 30 uses TransferJet (registered trademark) that is a close-proximity wireless transfer technology, for example. The communication coupler 30 includes a printed circuit board 31, a coupling electrode 32, and a coaxial connector 33. The coupling electrode 32 is included in a conductive member.

The printed circuit board 31 is formed in a plate-like shape of rectangular parallelepiped. The printed circuit board 31 extends in a coil axial line direction. The coil axial line direction is a direction along the central axis line X. On the printed circuit board 31, a circuit 310 is formed.

The coupling electrode 32 accumulates electrical charges used in communication. The coupling electrode 32 is connected to the circuit 310 of the printed circuit board 31 and is formed in a planar shape in a predetermined area on at least one surface of the printed circuit board 31. For example, the coupling electrode 32, as illustrated in FIG. 3, is formed in a T-shape and is formed in substantially a central area on one surface of the printed circuit board 31. On the forming face of the coupling electrode 32 of the printed circuit board 31, it is defined that the coil axial line direction is the height direction and that the direction orthogonal to the height direction in the forming face of the coupling electrode 32 is the width direction. The T-shaped coupling electrode 32 has a first electrode 320 extending in the width direction of the printed circuit board 31, and a second electrode 321 extending in the height direction of the printed circuit board 31. The second electrode 321 extends in the height direction from substantially the center of the first electrode 320. The first electrode 320 is formed on a communication side in the coil axial line direction of the communication coupler 30.

The coaxial connector 33 connects the circuit 310 of the printed circuit board 31 with a cable not illustrated.

The coupling electrode 32 of the communication coupler 30 intersects with an orthogonal plane P that is orthogonal to the coil axial line direction of the power transmission coil 20. In other words, the coupling electrode 32 is not parallel to the orthogonal plane P being orthogonal to the coil axial line direction. In the embodiment, the coupling electrode 32 is perpendicular to the orthogonal plane P being orthogonal to the coil axial line direction, and includes the coil axial line direction in the plane of the coupling electrode 32.

The communication coupler 30, when viewed from an orthogonal direction orthogonal to the coil axial line direction of the power transmission coil 20, is arranged at a position at which an end portion 311 on the communication side in the coil axial line direction of the communication coupler 30 is juxtaposed with the power transmission coil 20. That is, when viewed from the orthogonal direction orthogonal to the coil axial line direction, the communication coupler 30 is arranged at a position at which the end portion 311 on the communication side in the coil axial line direction of the communication coupler 30 is juxtaposed with an end portion 21 of the power transmission coil 20 being opposite to the substrate 10.

A power transmitting communication unit 1A, as illustrated in FIG. 4, is arranged facing another power transmitting communication unit 1B in the coil axial line direction. That is, the communication coupler 30 of the power transmitting communication unit 1A and the communication coupler 30 of the power transmitting communication unit 1B are arranged facing each other to be able to perform communication, and the power transmission coil 20 of the power transmitting communication unit 1A and the power transmission coil 20 of the power transmitting communication unit 1B are arranged facing each other to be able to perform electric power transmission. In this case, it is preferable that the coupling electrode 32 of the power transmitting communication unit 1A and the coupling electrode 32 of the power transmitting communication unit 1B be arranged within the same plane. The power transmitting communication unit 1A and the power transmitting communication unit 1B are in substantially the same configuration, and depending on a use mode, function as a transmitting side transmitting an electrical signal or as a receiving side receiving an electrical signal. Furthermore, the power transmitting communication unit 1A and the power transmitting communication unit 1B function, depending on the use mode, as a power transmitting side transmitting electric power or as a power receiving side receiving the electric power.

One example of a geometrical arrangement of the power transmitting communication unit 1A and the power transmitting communication unit 1B will be described. A communication distance between the communication coupler 30 of the power transmitting communication unit 1A and the communication coupler 30 of the power transmitting communication unit 1B is a maximum of approximately 10 mm, for example. That is, a distance Dc between the end portion 311 of the communication coupler 30 on the communication side in the coil axial line direction of the power transmitting communication unit 1A and the end portion 311 of the communication coupler 30 on the communication side in the coil axial line direction of the power transmitting communication unit 1B is a maximum of approximately 10 mm, for example.

Thus, when viewed from the orthogonal direction orthogonal to the coil axial line direction of the power transmission coil 20, because the end portion 311 on the communication side in the coil axial line direction of the communication coupler 30 is being arranged at a position juxtaposed with the end portion 21 of the power transmission coil 20 being opposite side to the substrate 10, a maximum distance Dp between the end portion 21 of the power transmission coil 20 in the power transmitting communication unit 1A and the end portion 21 of the power transmission coil 20 in the power transmitting communication unit 1B is approximately 10 mm, for example. When the distance in the coil axial line direction between the power transmitting communication unit 1A and the power transmitting communication unit 1B is away from the maximum distance Dp (approximately 10 mm), the communication of the communication couplers 30 is affected. For example, the communication speed of the communication coupler 30 may be decreased and an error in the communication of the communication couplers 30 may occur. When the distance in the coil axial line direction between the power transmitting communication unit 1A and the power transmitting communication unit 1B is equal to or smaller than the maximum distance Dp (approximately 10 mm), the communication of the communication couplers 30 is not affected.

Next, an example of the operation of the power transmitting communication unit 1 will be described. The following is described assuming that the power transmitting communication unit 1A performs transmitting an electrical signal and receiving electric power and that the power transmitting communication unit 1B performs receiving the electrical signal and transmitting the electric power.

When an electrical signal is input from a cable connected to the coaxial connector 33, the communication coupler 30 of the power transmitting communication unit 1A accumulates electrical charges in the coupling electrode 32. In a state that the power transmitting communication unit 1A and the power transmitting communication unit 1B are facing each other with a distance of approximately 10 mm or smaller, the communication coupler 30 of the power transmitting communication unit 1A transmits, to the communication coupler 30 of the power transmitting communication unit 1B, the electrical charges accumulated in the coupling electrode 32 as an electrical signal. The communication coupler 30 of the power transmitting communication unit 1B receives the electrical signal transmitted from the communication coupler 30 of the power transmitting communication unit 1A and outputs the electrical signal through a cable connected to the coaxial connector 33.

An AC power source not illustrated of the power transmitting communication unit 1B supplies electric power to the power transmission coil 20 through the power transmission circuit 12. When an electric current flows through the power transmission coil 20, a magnetic field is generated, and by an electromotive force induced by this magnetic field, an electric current flows through the power transmission coil 20 of the power transmitting communication unit 1A.

Figure 5:
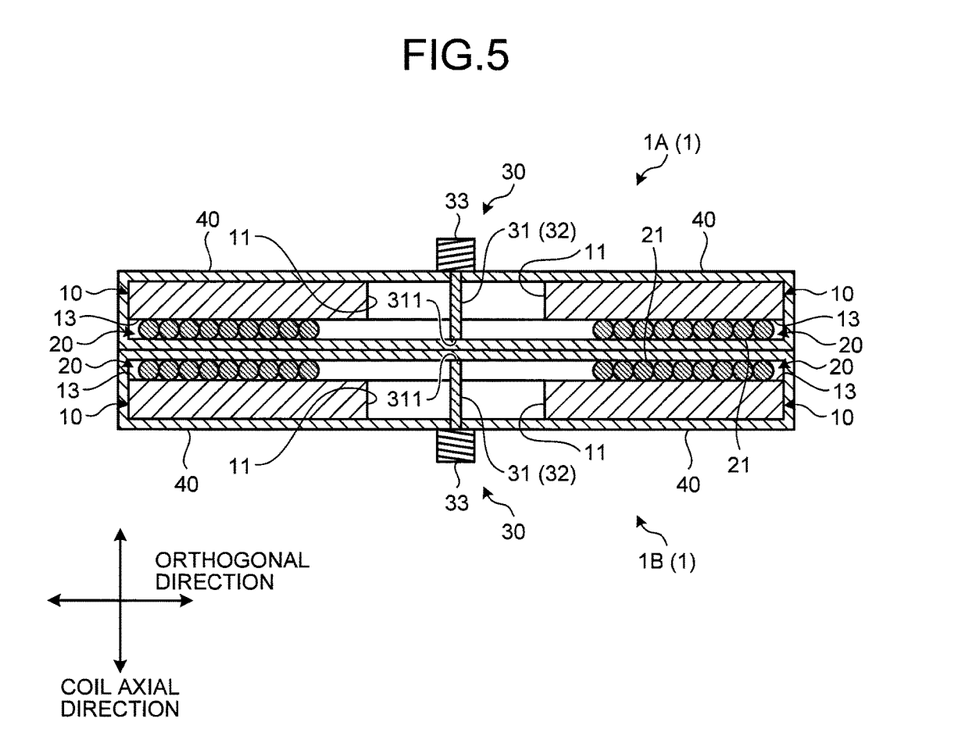
FIG. 5 is a sectional view illustrating a usage example (Example 1) of the power transmitting communication unit in the embodiment.
Figure 6:
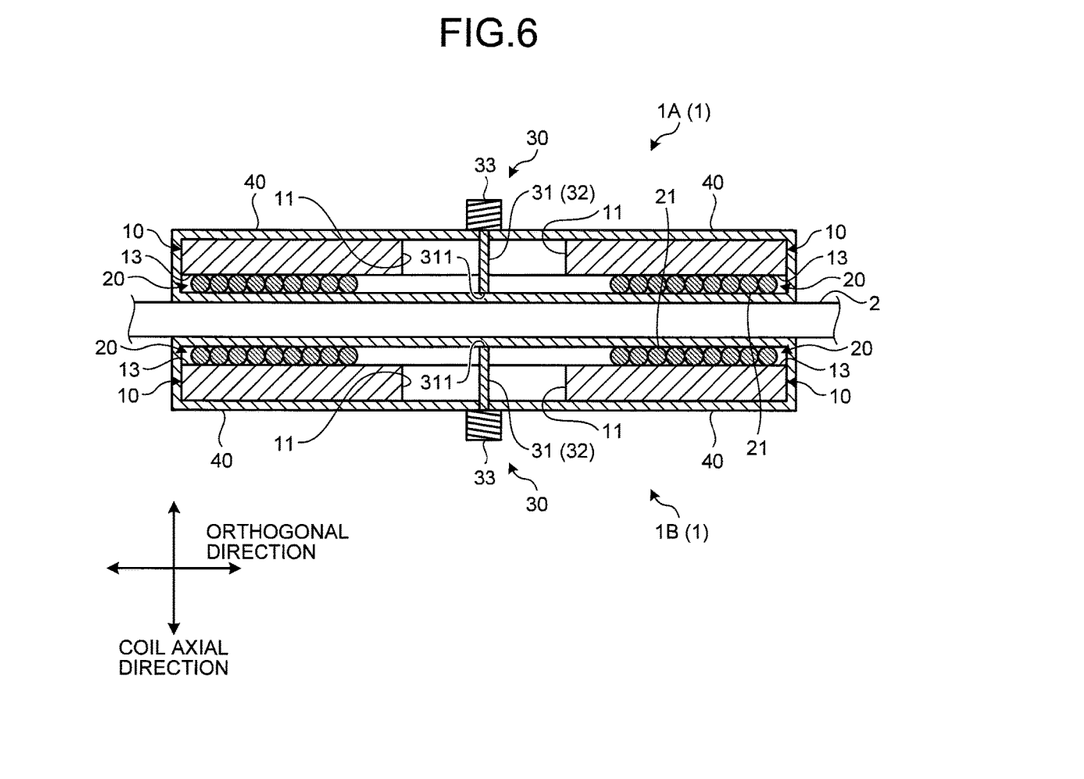
FIG. 6 is a sectional view illustrating a usage example (Example 2) of the power transmitting communication unit in the embodiment.

Next, a usage example of the power transmitting communication unit 1 will be described. FIG. 5 is a sectional view illustrating a usage example (Example 1) of the power transmitting communication unit in the embodiment. FIG. 6 is a sectional view illustrating a usage example (Example 2) of the power transmitting communication unit in the embodiment. The power transmitting communication units 1 illustrated in FIGS. 5 and 6 each have a housing 40 mounted thereon. The housing 40 is formed from, for example, resin, and protects the power transmission coil 20 and the communication coupler 30 mounted on the substrate 10.

As illustrated in FIG. 5, in a state that no obstacles are interposed between the power transmitting communication unit 1A and the power transmitting communication unit 1B, the power transmitting communication unit 1A and the power transmitting communication unit 1B may be communicably arranged facing each other in the coil axial line direction. Then, the communication coupler 30 of the power transmitting communication unit 1A transmits an electrical signal to the communication coupler 30 of the power transmitting communication unit 1B. The communication coupler 30 of the power transmitting communication unit 1B receives the electrical signal transmitted from the communication coupler 30 of the power transmitting communication unit 1A. Furthermore, the power transmission coil 20 of the power transmitting communication unit 1B transmits electric power to the power transmission coil 20 of the power transmitting communication unit 1A by magnetic field coupling. The power transmission coil 20 of the power transmitting communication unit 1A receives the electric power transmitted from the power transmission coil 20 of the power transmitting communication unit 1B.

Furthermore, as illustrated in FIG. 6, in a state that an obstacle 2 that is a non-conductive member is interposed between the power transmitting communication unit 1A and the power transmitting communication unit 1B, the power transmitting communication unit 1A and the power transmitting communication unit 1B may be communicably arranged facing each other in the coil axial line direction.

Figure 7:
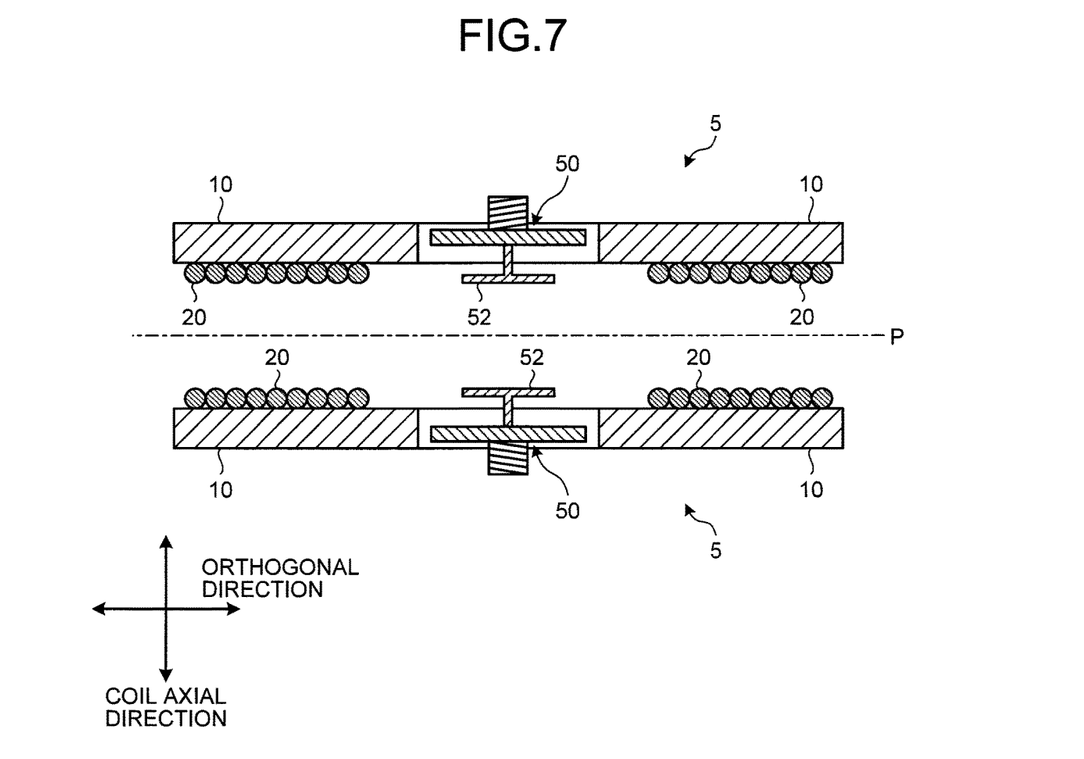
FIG. 7 is a sectional view illustrating an example of the configuration of a power transmitting communication unit according to a comparative example.
Figure 8:
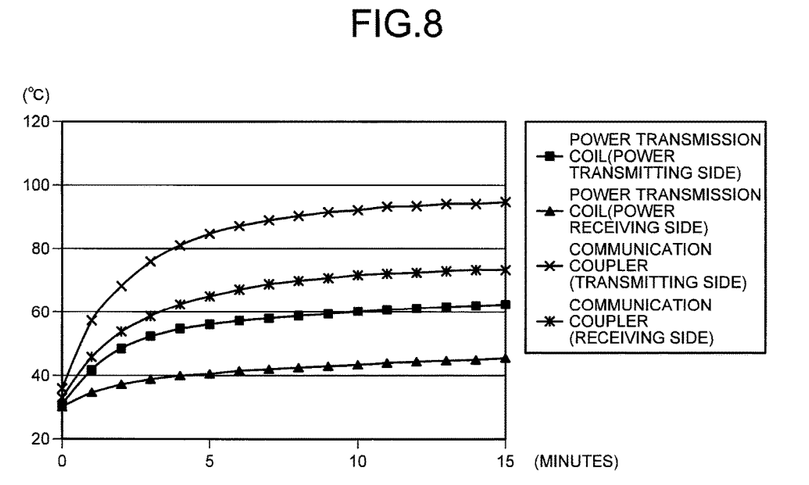
FIG. 8 is a chart illustrating an example of temperature rise (distance: 10 mm) in the comparative example.
Figure 9:
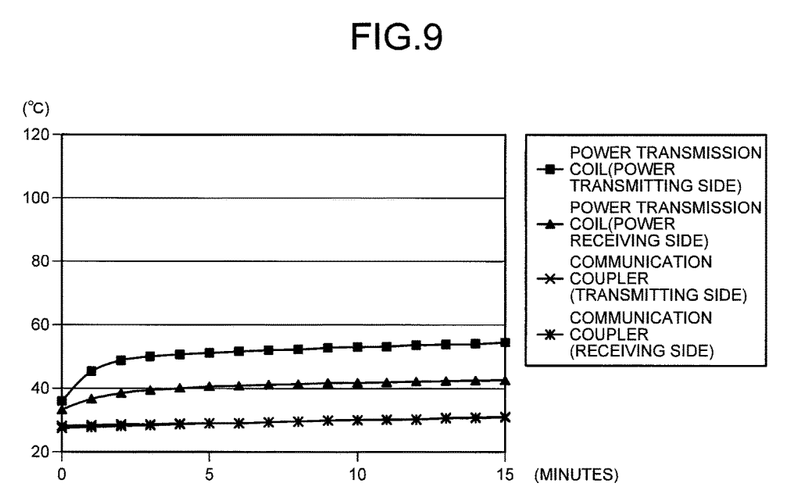
FIG. 9 is a chart illustrating an example of temperature rise (distance: 10 mm) in the embodiment.
Figure 10:
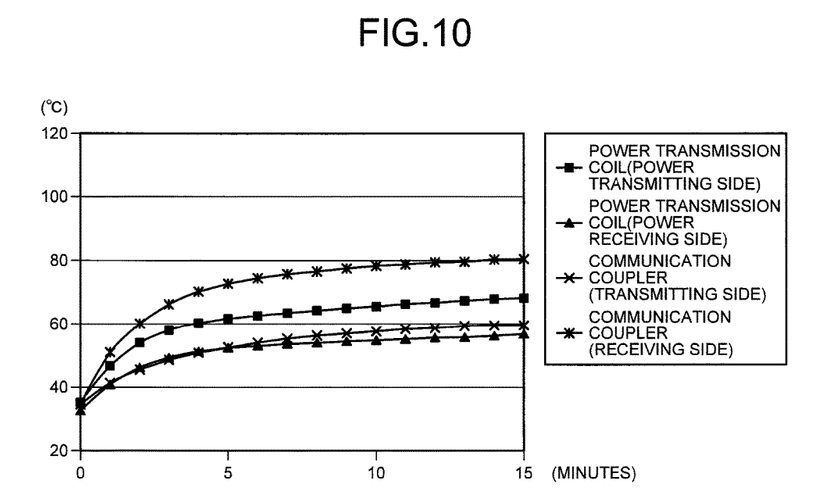
FIG. 10 is a chart illustrating an example of temperature rise (distance: 5 mm) in the comparative example.
Figure 11:
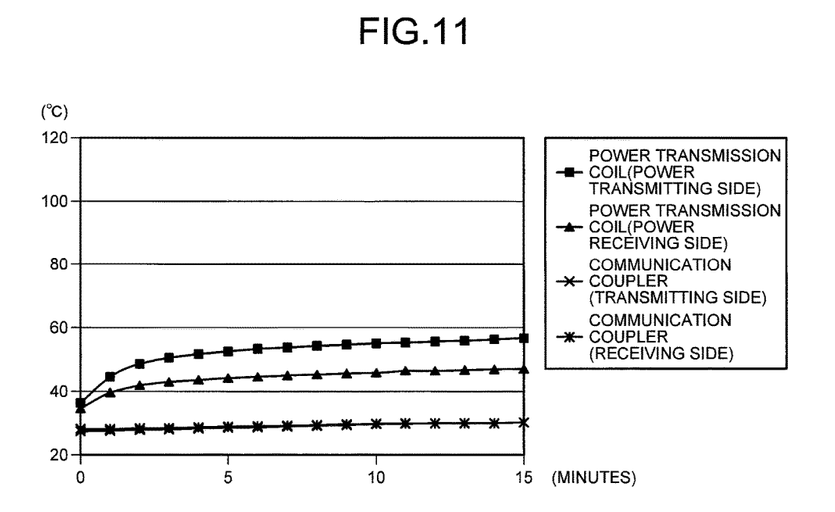
FIG. 11 is a chart illustrating an example of temperature rise (distance: 5 mm) in the embodiment.

Next, temperature changes in the communication coupler 30 and the power transmission coil 20 will be described while making comparisons with a comparative example. FIG. 7 is a sectional view illustrating an example of the configuration of a power transmitting communication unit according to a comparative example. FIG. 8 is a chart illustrating an example of temperature rise (distance: 10 mm) according to the comparative example. FIG. 9 is a chart illustrating an example of temperature rise (distance: 10 mm) in the embodiment. FIG. 10 is a chart illustrating an example of temperature rise (distance: 5 mm) in the comparative example. FIG. 11 is a chart illustrating an example of temperature rise (distance: 5 mm) in the embodiment. In FIGS. 8 to 11, the ordinate axis represents temperature and the abscissa axis represents time (minutes).

In the comparative example, as illustrated in FIG. 7, a coupling electrode 52 of a communication coupler 50 in a power transmitting communication unit 5 is formed in parallel with the orthogonal plane P orthogonal to the coil axial line direction of the power transmission coil 20. The distance in the coil axial line direction between the power transmitting communication unit 5 of the transmitting side in the comparative example and the power transmitting communication unit 5 of the receiving side is approximately 10 mm. In this case, in the power transmitting communication units in the comparative example, as illustrated in FIG. 8, at 15 minutes after starting the transmission of an electrical signal, the temperature of the communication coupler 50 of the transmitting side was 95° C. and the temperature of the communication coupler 50 of the receiving side was 73° C. Furthermore, at 15 minute after starting the transmission of electric power, the temperature of the power transmission coil 20 of the power transmitting side was 63° C. and the temperature of the power transmission coil 20 of the power receiving side was 46° C. The transmission efficiency of electric power was 84%.

Meanwhile, in the power transmitting communication unit 1 in the present embodiment, in the case that the distance in the coil axial line direction between the power transmitting communication unit 1A and the power transmitting communication unit 1B is approximately 10 mm, as illustrated in FIG. 9, at 15 minutes after starting the transmission of an electrical signal, the temperature of the communication coupler 30 of the transmitting side was 31° C. and the temperature of the communication coupler 30 of the receiving side was 31° C. Furthermore, at 15 minute after starting the transmission of electric power, the temperature of the power transmission coil 20 of the power transmitting side was 54° C. and the temperature of the power transmission coil 20 of the power receiving side was 43° C. The transmission efficiency of electric power was 89%.

In the power transmitting communication unit 1 in the present embodiment, as compared with the power transmitting communication unit in the comparative example, the temperature of the communication coupler 30 of the transmitting side was reduced by 64° C. and the temperature of the communication coupler 30 of the receiving side was reduced by 42° C. Furthermore, in the power transmitting communication unit 1 in the present embodiment, as compared with the power transmitting communication unit in the comparative example, the temperature of the power transmission coil 20 of the power transmitting side was reduced by 9° C. and the temperature of the power transmission coil 20 of the power receiving side was reduced by 3° C. In the power transmitting communication unit in the present embodiment, as compared with the power transmitting communication unit in the comparative example, the transmission efficiency of electric power was improved by 5%.

In the case that the distance in the coil axial line direction between the power transmitting communication unit 5 of the transmitting side in the comparative example and the power transmitting communication unit 5 of the receiving side is approximately 5 mm, as illustrated in FIG. 10, at 15 minutes after starting the transmission of an electrical signal, the temperature of the communication coupler 50 of the transmitting side was 59° C. and the temperature of the communication coupler 50 of the receiving side was 80° C. Furthermore, at 15 minute after starting the transmission of electric power, the temperature of the power transmission coil 20 of the power transmitting side was 68° C. and the temperature of the power transmission coil 20 of the power receiving side was 57° C. The transmission efficiency of electric power was 84%.

Meanwhile, in the power transmitting communication unit 1 in the present embodiment, in the case that the distance in the coil axial line direction between the power transmitting communication unit 1A and the power transmitting communication unit 1B is approximately 5 mm, as illustrated in FIG. 11, at 15 minutes after starting the transmission of an electrical signal, the temperature of the communication coupler 30 of the transmitting side was 30° C. and the temperature of the communication coupler 30 of the receiving side was 31° C. Furthermore, at 15 minute after starting the transmission of electric power, the temperature of the power transmission coil 20 of the power transmitting side was 57° C. and the temperature of the power transmission coil 20 of the power receiving side was 48° C. The transmission efficiency of electric power was 88%.

In the power transmitting communication unit 1 in the present embodiment, as compared with the power transmitting communication unit 5 in the comparative example, the temperature of the communication coupler 30 of the transmitting side was reduced by 29° C. and the temperature of the communication coupler 30 of the receiving side was reduced by 49° C. Furthermore, in the power transmitting communication unit 1 in the present embodiment, as compared with the power transmitting communication unit in the comparative example, the temperature of the power transmission coil 20 of the power transmitting side was reduced by 11° C. and the temperature of the power transmission coil 20 of the power receiving side was reduced by 9° C. In the power transmitting communication unit 1 in the present embodiment, as compared with the power transmitting communication unit in the comparative example, the transmission efficiency of electric power was improved by 4%.

As in the foregoing, with the power transmitting communication unit 1 in the embodiment, the coupling electrode 32 of the communication coupler 30 intersects with the orthogonal plane P orthogonal to the coil axial line direction of the power transmission coil 20. Thus, the area of the coupling electrode 32 in which eddy currents generated by the magnetic field of the power transmission coil 20 flow can be reduced. Consequently, because the eddy currents that flow to the coupling electrode 32 can be suppressed, the temperature rise of the coupling electrode 32 can be suppressed. Furthermore, in the power transmission coil 20, because the influence received from the magnetic field of the coupling electrode 32 can be suppressed, eddy currents that flow to the power transmission coil 20 can be suppressed and the temperature rise in the power transmission coil 20 can be suppressed. In the power transmission coil 20, because the influence received from the magnetic field of the coupling electrode 32 can be suppressed, the transmission efficiency of electric power can be improved. Moreover, even when the coupling electrode 32 is brought close to the magnetic field of the power transmission coil 20, the temperature rise can be suppressed. That is, when viewed from the orthogonal direction orthogonal to the coil axial line direction of the power transmission coil 20, even when the end portion 311 on the communication side in the coil axial line direction of the communication coupler 30 is arranged at a position juxtaposed with the coil end portion 21 of the power transmission coil 20 being opposite to the substrate 10, the temperature rise can be suppressed.

Furthermore, the coupling electrode 32 of the communication coupler 30 includes the coil axial line direction in the plane of the coupling electrode 32. Thus, because the area of the coupling electrode 32 in which eddy currents flow can be minimized, the eddy currents that flow in the coupling electrode 32 can be suppressed to a minimum.

Modification

Next, a modification of the embodiment will be described. The situation of using TransferJet (registered trademark) that is a close-proximity wireless transfer technology has been exemplified. However, other close-proximity wireless transfer technologies may be used.

Furthermore, the example in which the coupling electrode 32 is formed in a T-shape has been exemplified. However, the coupling electrode 32 may be in any shape as long as it is in a shape capable of performing wireless communication.

In the substrate 10, the insulating material 10a that includes ferrite that is a magnetic body is used. However, it may be an insulating material that contains no magnetic body. When the insulating material 10a contains a magnetic body, the magnetic body is not limited to ferrite.

The coupling electrode 32 does not necessarily need to be perpendicular to the orthogonal plane P. It only needs to have an angle with respect to the orthogonal plane P. In this case, it is preferable that the coupling electrode 32 of the power transmitting communication unit 1A and the coupling electrode 32 of the power transmitting communication unit 1B be arranged within the same plane. The coupling electrode 32 of the power transmitting communication unit 1A and the coupling electrode 32 of the power transmitting communication unit 1B do not necessarily need to be arranged within the same plane. The coupling electrodes 32 may be arranged along the same plane within a range in which performing communication is possible.

The conductive member of the communication coupler 30 that includes the coupling electrode 32 has been exemplified. However, in addition to the coupling electrode 32, the conductive member may include the circuit 310 of the printed circuit board 31. In this case, the circuit 310 of the printed circuit board 31 intersects with the orthogonal plane P orthogonal to the coil axial line direction of the power transmission coil 20. That is, the circuit 310 of the printed circuit board 31 is not in parallel with the orthogonal plane P orthogonal to the coil axial line direction of the power transmission coil 20. For example, the circuit 310 of the printed circuit board 31 is perpendicular to the orthogonal plane P being orthogonal to the coil axial line direction, and includes the coil axial line direction in the plane of the circuit 310 of the printed circuit board 31.

With the power transmitting communication unit according to the present embodiment, because the conductive member of the communication module intersects with the orthogonal plane orthogonal to the coil axial line direction of the power transmission coil, the temperature rise in the communication module can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmitting communication unit comprising:
   a substrate that includes an opening;
   a power transmission coil that is spirally formed around the opening and centered about a central axis, mounted on one surface of the substrate, connected to a circuit of the substrate, and performs transmission of electric power in a non-contact manner; and
   a communication module that is installed at the opening, the communication module includes a conductive member, a connector, an end portion, and a module surface, each of the end portion and the connector is located outside of the substrate, the module surface extends from the end portion and into the opening, the conductive member is formed in a planar shape and mounted on the module surface, and the communication module performs wireless communication through the conductive member, wherein
   the conductive member of the communication module intersects with an orthogonal plane that is orthogonal to a coil axial line direction of the power transmission coil.

2. The power transmitting communication unit according to claim 1, wherein
   the conductive member of the communication module includes the coil axial line direction in a plane of the conductive member.

3. The power transmitting communication unit according to claim 1, wherein
   the communication module includes a printed circuit board, and
   the conductive member is connected to a circuit of the printed circuit board, formed in a predetermined area on at least one surface of the printed circuit board, and includes a coupling electrode that accumulates electrical charges.

* * * * *